(12) United States Patent
Zhao et al.

(10) Patent No.: US 10,447,656 B2
(45) Date of Patent: Oct. 15, 2019

(54) ENFORCING PER-APPLICATION VPN POLICIES FOR APPLICATIONS DELIVERED IN VIRTUALIZED COMPUTING ENVIRONMENTS

(71) Applicant: VMware, Inc., Palo Alto, CA (US)

(72) Inventors: Sam Zhao, Beijing (CN); Nan Wang, Beijing (CN); Shengbo Teng, Beijing (CN); Jingtao Zhang, Beijing (CN); Jinrong Wu, Beijing (CN); Wen Wang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 162 days.

(21) Appl. No.: 15/802,378

(22) Filed: Nov. 2, 2017

(65) Prior Publication Data

US 2019/0132291 A1    May 2, 2019

(51) Int. Cl.
*G06F 17/00* (2019.01)
*H04L 29/06* (2006.01)
*G06F 9/455* (2018.01)

(52) U.S. Cl.
CPC ...... *H04L 63/0263* (2013.01); *G06F 9/45558* (2013.01); *H04L 63/0272* (2013.01); *G06F 2009/45595* (2013.01); *H04L 63/029* (2013.01); *H04L 63/10* (2013.01); *H04L 63/20* (2013.01)

(58) Field of Classification Search
CPC combination set(s) only.
See application file for complete search history.

(56) References Cited

U.S. PATENT DOCUMENTS

| | | | |
|---|---|---|---|
| 8,468,225 B2 * | 6/2013 | Shlomo | H04W 36/0033 709/220 |
| 8,925,064 B1 * | 12/2014 | Bressler | H04L 29/0685 726/11 |
| 9,237,070 B2 * | 1/2016 | Hill | H04L 12/4641 |
| 9,264,403 B2 * | 2/2016 | Flinta | G06F 9/455 |
| 9,338,181 B1 * | 5/2016 | Burns | H04L 63/1433 |

* cited by examiner

*Primary Examiner* — Amare F Tabor

(57) ABSTRACT

A VPN tunnel policy is defined on a per-application basis. The VPN tunnel policy may specify that a particular application is permitted to transmit data on a specific VPN tunnel. Subsequently, the specified application is delivered to one or more virtual machines and an application tunnel manager creates a new virtual network interface card (NIC) on the VM, corresponding to the delivered application. The newly created virtual NIC is attached to a specified subnet. The subnet may be a VPN transition network with a connection to a VPN gateway device. The subnet may have been previously defined or generated at the time of assigning the application to the VPN tunnel. Once the virtual NIC has been created on the VM, an OS script is executed to force the delivered application to use the newly created virtual NIC and to prevent users from changing the application and virtual NIC linkage.

14 Claims, 5 Drawing Sheets

US 10,447,656 B2

ENFORCING PER-APPLICATION VPN POLICIES FOR APPLICATIONS DELIVERED IN VIRTUALIZED COMPUTING ENVIRONMENTS

TECHNICAL FIELD

The present disclosure generally relates to networking for software applications in a virtualized environment and more particularly relates to enforcing policies that enable access to virtual private networks (VPNs) on a per-application basis.

BACKGROUND

A virtual private network (VPN) enables a computer to securely access resources located on a private network over a public network (e.g. Internet) connection. This is performed by establishing a VPN tunnel, which serves as an encrypted link between the external computer and the resources located behind the firewall on the private network. VPNs are often used to allow individual employees of a business or other organization to securely access the corporate intranet when the employees are located outside of the organization's physical premises. However, VPNs can also be implemented in a site-to-site configuration, where a VPN tunnel is established between gateway devices located in different physical locations (e.g. data centers) to create a single private network across both locations such that computers in each location can privately access the other location as though they were on the same local network by utilizing the gateway device located at their respective location.

One example of a setting where site-to-site VPN configurations are used is the remote desktop environment, such as those based on virtual desktop infrastructure (VDI) or Desktop-as-a-Service (DAAS). In such environments, a user is typically provisioned with a virtual desktop and allowed to access their virtual desktop over a remote network connection, such as an Internet connection. The virtual desktops are implemented as virtual machines hosted on servers that reside in a data center located remotely from the user, and each host server may execute multiple virtual machines. Users can utilize a client device with a virtual desktop client application installed thereon to remotely log into their individual virtual desktop and the application execution takes place on the remote host server which is linked to the client device over the network, using a remote display protocol such as VMware Blast, remote desktop protocol (RDP), PC-over-IP (PCoIP), virtual network computing (VNC), or the like. Using such a remote desktop protocol, the user can interact with applications of the virtual desktop, which are running on the remote host server, such that only the display (i.e. framebuffer pixel data), keyboard, and mouse information is communicated with the local client device. A common implementation of this approach is to host multiple desktop operating system instances as individual virtual machines (VMs) on a server hardware platform running a hypervisor that manages the VMs.

Often, the applications running on the user's desktop need VPN access in order to access private resources which are located in other data centers, which are located in different locations from the server that is hosting the user's desktop. For example, the user may need to access a corporate intranet page provided by the employer's web server, which is located behind a firewall in a different physical network from the virtual desktop. In order to access the page, the web browser may require VPN access and it is therefore important to set up a VPN connection for the web browser application. Moreover, it is usually good practice to enforce VPN access on a per-application basis, so that other applications are not permitted to access private resources that they should not have access to. In light of this, certain operating systems (e.g. Microsoft Windows 10) have introduced features which enable an application to automatically trigger VPNs, a feature which can be quite useful when an application requires a VPN connection to send data.

To enable per-application VPN (e.g. using such an OS feature), an administrator would normally need to manually setup the VPN on each desktop and then enable auto-triggering of the VPN and split tunneling for specific applications, a process which is at the very least cumbersome and in some cases not secure. Moreover, recent developments in virtual desktop technology have enabled the delivery of individual applications to the virtual desktop in nearly real time, such as upon user login. Such "real-time" application delivery utilizes desktop pools which are not dedicated and do not have specific applications pre-installed and pre-configured thereon. Instead, the applications are assigned to such desktops at the time of user login, allowing any desktop to be assigned to any user, while still enabling per-user configuration of applications. This allows better utilization of physical resources and reduction of overall costs, however, if the desktop pool is floating and the applications are delivered in real-time to vast number of desktops, the manual configuration of VPN in each desktop becomes impractical. Furthermore, any changes that are triggered in VPN entitlements, could lead to massive administrative efforts on all affected desktops. An improved approach to managing VPN access on a per-application basis is needed.

DETAILED DESCRIPTION

Systems and methods in accordance with various embodiments of the present disclosure overcome at least some of the above-mentioned shortcomings and deficiencies by enabling techniques for automatically enforcing VPN policies on a per-application basis in a virtualized computing environment, such as VDI or DAAS environments. In various embodiments, network virtualization software is used to assign a VPN tunnel to an application at the time of delivering the application to the virtual machine, such as by using a rapid application delivery technology that assigns applications to virtual machines at the time of user login. Once the VPN tunnel is assigned, the application is immediately enabled with access to the VPN and the user can begin accessing the resources over the VPN connection.

In various embodiments, an administrator first defines a per-application VPN tunnel policy. The VPN tunnel policy may specify, for example, that a particular application is permitted to transmit data on a specific VPN tunnel. Subsequently, any time the specified application is delivered to any virtual machine (VM), an application tunnel manager can create a new virtual network interface card (NIC) on the VM, corresponding to the delivered application. The tunnel manager can then invoke the network virtualization software APIs to attach the newly created virtual NIC to a specified subnet. The subnet may be a VPN transition network with a connection to a VPN gateway device. In some embodiments, the subnet may have been previously defined, while in other embodiments, the subnet may be generated at the time of assigning the application to the VPN tunnel by using the network virtualization software. Once the virtual NIC has been created on the VM, an in-guest operating system (OS) script may be executed to force the delivered application to use the newly created virtual NIC and to prevent users from changing the application and virtual NIC linkage. After these steps have been completed, the user may log into the VM hosting their individual desktop and use the specified application to access the VPN connection.

If the administrator subsequently changes the VPN tunnel policy, the VPN tunnel record may be removed and the application tunnel manager may invoke the network virtualization software APIs to disconnect any affected VMs containing the application from the VPN transition network. Additionally, the newly created NIC may be removed from any virtual machines containing the application by invoking the APIs of the hypervisor hosting the VMs.

Figure 1:
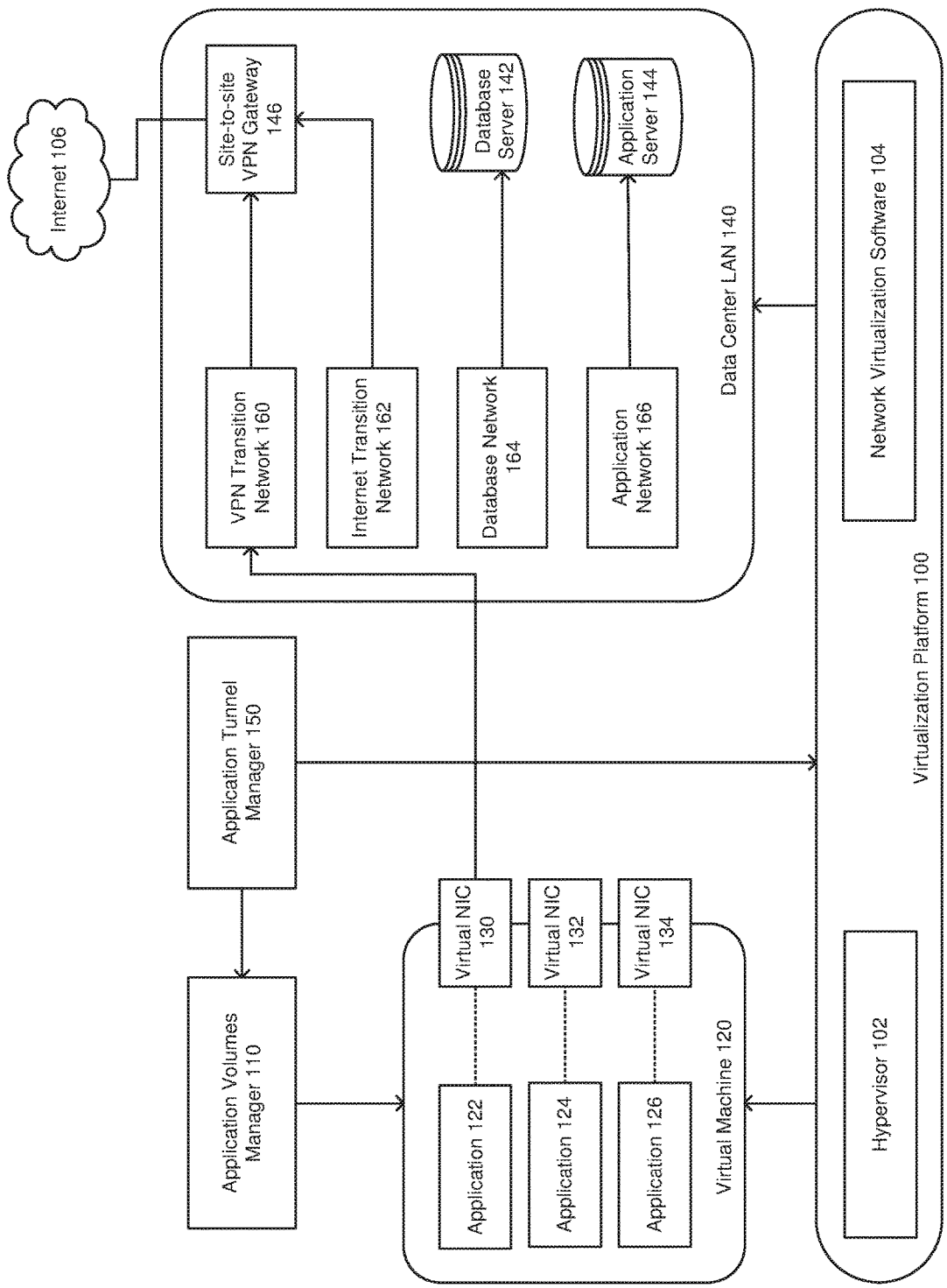
FIG. 1 illustrates an example of a system where per-application VPN policies may be enforced on applications delivered to virtual machines, in accordance with various embodiments.

FIG. 1 illustrates an example of a system where per-application VPN policies may be managed when applications are delivered to virtual machines, in accordance with various embodiments. In the illustrated embodiment, an administrator (or other user) first creates a per-application VPN tunnel policy using the application tunnel manager 150. The application tunnel manager 150 can be implemented as an application, virtual appliance or any other computer program capable of handling the tasks of managing per-application VPN policies as described throughout the present disclosure. In one embodiment, application tunnel manager 150 provides a graphical user interface (GUI) that the administrator can use to create a VPN tunnel policy record by specifying an application and the VPN tunnel which the application is permitted to access. An example of such VPN tunnel policy records is shown below:

| ID | Application | VPN |
|----|-------------|-----|
| 1 | Firefox | VPN to Palo Alto Office |
| 2 | Putty | VPN to IBM Softlayer Staging |

In some embodiments, before the administrator specifies a VPN tunnel policy, the appropriate VPN tunnels have been set up in the data center network infrastructure. Following the example above, there may be a VPN transition network previously established in the local site which links to a VPN tunnel to the "Palo Alto Office" site that is remotely located. In alternative embodiments, the VPN transition network need not be established prior to specifying the VPN tunnel policy and the VPN transition network can be automatically created by invoking the APIs of the network virtualization software 104 at the time of assigning the application to the virtual machines.

Once the VPN tunnel policy has been created for the application, the IT administrator can assign the application to one or more virtual machines. In one embodiment, the application can be assigned to the VMs using a real-time application delivery system, such as the application volumes manager 110. The application delivery system can be any software tool capable of remotely adding individual applications to a virtual machine or removing applications from a virtual machine. One example of the application delivery system (i.e. application volumes manager 110) is VMware App Volumes™ commercially available from VMware, Inc of Palo Alto, Calif. However, it should be recognized that other commercially available application delivery tools that are able to deliver applications to virtual machines can also be utilized within the scope of the various embodiments.

When the IT administrator assigns the application to the VM, the application tunnel manager 150 invokes the application volumes manager 110 to determine which applications (e.g. applications 122, 124, 126) have been assigned to which VMs. For example, a particular web browser application 122 (e.g. Firefox) may have been assigned by the administrator to ten (10) virtual machines in the desktop pool, including virtual machine 120. Once this information is determined, the application tunnel manager 150 looks up the application 122 and VPN tunnel policy records to determine whether there are any VPN tunnel policies created for the application 122 being assigned to the VMs. If a VPN tunnel policy exists for application 122, the application tunnel manager 150 invokes the Application Programming Interfaces (APIs) of the hypervisor 102 to create a new virtual network interface card (NIC) in all of the target virtual machines which the application has been assigned to. In the illustrated embodiment, the application tunnel manager 150 invokes the APIs of hypervisor 102 to create virtual NIC 130 on virtual machine 120 for use by the application 122. As further shown in the illustration each application (122, 124, 126) may have its own individual virtual NIC (130, 132, 134) created and assigned to it. If no VPN tunnel policy exists for an application being assigned then it is not necessary to create a new virtual NIC in the VM for this purpose.

Once the new virtual NIC has been created on each target VM, the application tunnel manager 150 invokes an in-guest operating system (OS) script to force the newly assigned application 122 to use the newly create virtual NIC 130. There is a number of ways to force an application to use a specific network card. For example, the IT administrator can set up a group policy object (GPO) to block any normal user (user without admin privileges) from changing the application and virtual NIC linkage in the guest operating system of the VM. Such a configuration ensures that normal users can only pass the application data through the specified network card instead of the other network cards occupied by its corresponding application.

The application tunnel manager 150 then invokes the APIs of the network virtualization software 104 to join the target VM 120 to the corresponding VPN transition network 160 with a connection to the site-to-site VPN gateway 146. As a result, the newly created virtual NIC 130 receives an Internet Protocol (IP) address on the VPN transition network 160, either from the Dynamic Host Configuration Protocol (DHCP) server or otherwise assigned by the system. The VPN transition network 160 may be a subnet of the data center local area network (LAN) 140. The local network 140 of the data center may include any number of different subnets, such as the Internet transition network 162, the database network 164 with a connection to the database server 142 and the application network 166 with a connection to the application server 144, among others. The VPN gateway 146 is a device (e.g. router, a server, etc.) that creates a VPN connection to bridge the communication between devices on the local network 140 and a different site located remotely away over the Internet 106. It does so by establishing a VPN tunnel (i.e. encrypted connection) with a similar VPN gateway located at the other site.

After the above steps are completed, the user may log into the virtual machine 120 hosting their virtual desktop and launch the application 122 with VPN access to the remote site. If the IT administrator later changes the per-application VPN tunnel policy in the system, the application tunnel manager 150 would look up the corresponding application assignment information from the application volumes manager 110 and obtain the list of VMs affected by the change in policy. The application tunnel manager 150 would then invoke the APIs of the network virtualization software 104 to disconnect the affected VMs (e.g. VM 120) from the VPN transition network 160. In addition, the application tunnel manager 150 may invoke the hypervisor 102 APIs to remove the affected virtual NIC 130 from the VM 120.

As previously described, the application assignment and removal may be performed by the application volumes manager 110. The application volumes manager 110 performs real-time delivery of applications to virtual machines by dynamically attaching an application storage volume to the VM. In one embodiment, the application storage volume can be attached by mounting the virtual hard disk containing all of the components of the application to the VM and modifying the registry keys, file paths and other information to make the application appear as though it has been locally installed on the VM. Alternatively, the act of attaching the application volume may involve mapping or otherwise making available the application volume to the operating system of the VM. For example, the volume containing the application may be mapped and registry settings changed to direct future calls of that file type to the application stored in the virtual hard disk. The mapping and modifying the registry entries may be performed by an agent operating in the VM which is in communication with the application volumes manager 110. For example, the agent may receive instructions from application volumes manager 110 to attach the application storage volume to the VM or detach the application storage volume from the VM.

Such an application storage volume may include all of the content that comprises the application, including binary files, libraries, registry entries and the like. Rather than having to download, extract, and write all these files to each individual VM, the application storage volume can instead be attached by mounting the volume and overlaying the contents, such as files and directories, with respect to their local counterparts. Mounting an application storage volume may be accomplished by associating the name of the volume with an access path to the volume. Once mounted, the application files, directories, and other application elements may be overlaid within the file system of the VM in order to provide the user with access to the application, without going through the traditional installation process. Overlaying may be accomplished by editing the file system to redirect requests to the components on the newly-mounted volume (e.g., virtual disk), instead of pointing to the local counterpart components which would normally be installed in the various installation folders. In this manner, the IT administrator may utilize the application volumes manager 110 to remotely add and remove applications to/from virtual machines (such as VM 120) as needed, all without the need to individually go through the installation process for each application on each VM. At the time of attaching the application storage volume to the VM, the application tunnel manager 150 may also carry out the function of creating virtual NICs and attaching them to the VPN transition network, as previously described.

In some embodiments, the application storage volume is a virtual disk, as available for example in the virtual machine hard disk (VMDK) format or the virtual hard disk (VHD) format. In alternative embodiments, the application storage volume may take a different form, such as hard disk partitions, flash memory portions, or other virtual or non-virtual storage locations. In some embodiments, the application storage volume can be detached from the computing device, thereby removing the application on the VM. The process of detaching the application volume may include un-mounting the virtual disk from the VM, or preventing the VM from accessing the virtual disk and the corresponding components.

In the illustrated embodiment, the processes of creating virtual NICs, attaching the virtual NICs to the VPN transition network and setting up logical networks based on application tunnel policy is performed by the virtualization platform 100 according to instructions from the application tunnel manager 150. The virtualization platform 100 includes a hypervisor 102 and network virtualization software 104.

The hypervisor 102, also sometimes referred to as a virtual machine monitor or a virtual machine manager (VMM), refers to the software that executes virtual machines on a physical computer. The physical computer on which the hypervisor is running is usually referred to as the "host" computer, while the individual virtual machines are referred to as "guests". Each virtual machine (VM) can be a full virtual representation of a real physical computer, including a virtual representation of the hard drive (referred to herein as a virtual disk or a virtual machine disk (VMDK)), and the VM can run a full instance of a complete operating system (referred to as a "guest" operating system). Generally, hypervisors can be classified into two categories—the type 1 "native" hypervisors (also sometimes referred to as "bare metal" hypervisors) and the type 2 "hosted" hypervisors. Native hypervisors run directly on the host computer's hardware and native hypervisors can themselves host multiple virtual machines that have individual guest operating systems. In contrast, hosted hypervisors run within a conventional host operating system (e.g, Windows, Linux, macOS, etc.) and thus hosted hypervisors represent a second layer of software above the hardware. Traditionally, virtual desktop environments have been implemented using native hypervisors, however some of the techniques described in this disclosure can be applied to native hypervisors as well. One example of a native hypervisor that can be implemented with the embodiments herein is VMware ESXi™ available as part of the VMware vSphere® product commercially provided by VMware, Inc. of Palo Alto, Calif. However, it will be evident to one of ordinary skill in the art that any other virtualization technologies such as Xen® and Microsoft Hyper-V® may be utilized in accordance with the various embodiments.

In various embodiments, the hypervisor 102 is used to perform various functions needed to execute a VM on a host computer, including creating a virtual network interface card (NIC). A virtual NIC is an abstract virtualized representation of a computer network interface that may correspond directly to a physical network interface controller. It is conventional that several virtual NICs are mapped to a single physical network interface controller, though this is not a limitation to all embodiments described herein. In various embodiments, the hypervisor exposes one or more APIs that enables management programs to execute various functions on the VMs being executed by the hypervisor, including API calls to create or remove virtual NICs to/from a VM. In one embodiment, the application tunnel manager 150 invokes such APIs of the hypervisor 102 in order to create a new virtual NIC 130 corresponding to the application being attached to the VM.

In various embodiments, the network virtualization software 104 is used to perform the attaching of the newly create virtual NIC to the VPN transition network and setting up the various logical networks and subnets that may be required for the embodiments described herein. Generally, network virtualization software abstracts networking aspects from the underlying hardware and brings the conventional network provisioning and configuration tasks into the software layer. Network virtualization software may also enable numerous functions, such as switching, routing, distributed firewalling, load balancing and the like. One example of the network virtualization software is VMware NSX™ commercially available from VMware, Inc. of Palo Alto, Calif. However, it will be evident that other network virtualization software tools can be utilized within the scope of the various embodiments.

Figure 2:
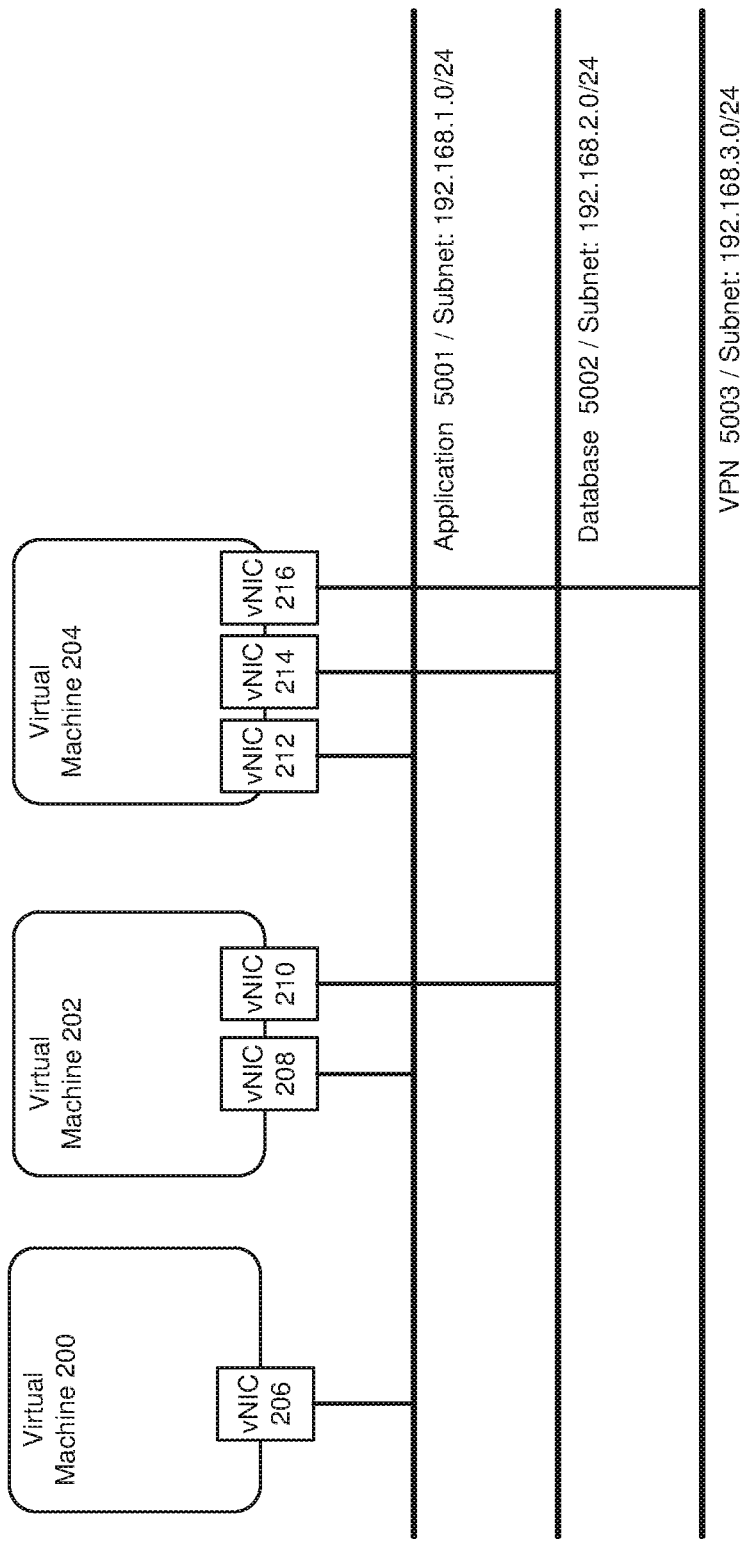
FIG. 2 illustrates an example of a virtual machine added to a VPN transition network, in accordance with various embodiments.

FIG. 2 illustrates an example of a virtual machine added to a VPN transition network, in accordance with various embodiments. In the illustration, there are three different subnets which are part of the local site network, including the Application 5001/Subnet: 192.168.1.0/24, the Database 5002/Subnet: 192.168.2.0/24 and the VPN 5003/Subnet: 192.168.3.0/24. Various virtual machines (200, 202, 204) in the local site can be added to any of the subnets by creating a virtual NIC on the VM and setting up an IP address in the desired subnet for the virtual NIC.

In the illustration, all of the virtual machines 200, 202, 204 include virtual NICs (206, 208, 212) which have received IP addresses on the Application 5001 subnet and thus each of these VMs can access the Application subnet. Virtual machines 202 and 204 further include virtual NICs (210, 214) which have IP addresses on the Database 5002 subnet and are therefore able to access that subnet. Finally, VM 204 also includes virtual NIC 216 which receives an IP address on the VPN subnet (i.e., VPN transition network) and can therefore access the VPN connection. As previously mentioned, since the virtual NICs may be associated with individual applications on the VM, the access to these subnets may be controlled on a per-application basis.

Figure 3:
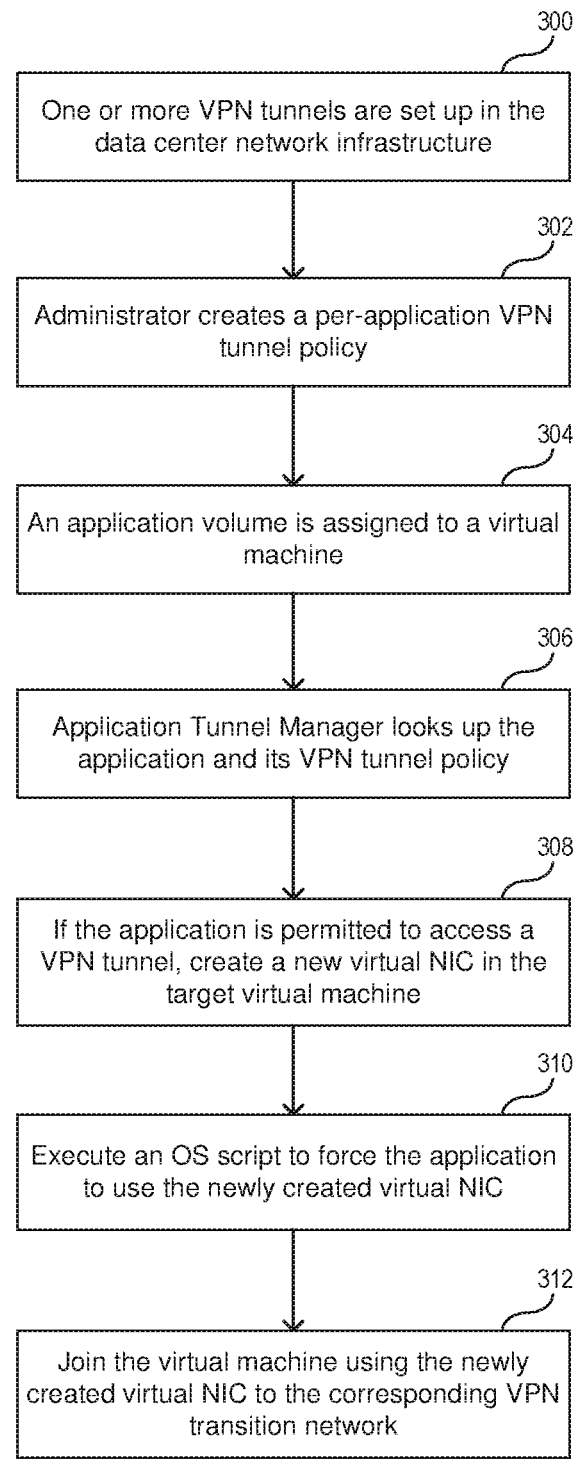
FIG. 3 illustrates an example process for enabling VPN access on a per-application basis in a virtualized computing environment, in accordance with various embodiments.

FIG. 3 illustrates an example process for enabling VPN access on a per-application basis in a virtualized computing environment, in accordance with various embodiments. As shown in operation 300, one or more VPN tunnels may be set up in the local site (e.g. local data center network infrastructure. It should be noted that in some alternative embodiments, the VPN tunnels need not be pre-established; they may be generated at the time of assigning the application to the virtual machine instead.

In operation 302, an IT administrator creates a per-application VPN policy. The administrator may do this specifying a specific application in the local site that is allowed to access a specific VPN tunnel. For example, the administrator may specify that the Firefox web browser application is allowed to access the VPN tunnel to the employee's corporate intranet located at a different site.

In operation 304, the application is assigned to one or more virtual machines. For example, the administrator may utilize the application volumes manager to assign the Firefox web browser application to a set of 10 VMs hosting the desktops of 10 individual users. In operation 306, the application tunnel manager looks up the VPN tunnel records to determine if there has been any VPN tunnel policy specified for the application. If the application tunnel manager determines that the application does have an associated VPN tunnel policy, a new virtual NIC is created on all VMs to which this application is being assigned, as shown in operation 308. In one embodiment, the virtual NIC is created before the user logs into their desktop, at the time of provisioning the virtual desktop for the user. Once the virtual NIC has been created on the VM, the application tunnel manager may invoke an OS script on each VM to force the assigned application to use the newly created virtual NIC, as shown in operation 310. The application tunnel manager then invokes the APIs of the network virtualization software to join each virtual machine to the specified VPN tunnel by creating an IP address on the VPN transition network for each newly created virtual NIC, as shown in operation 312. At this time, the user may login and launch the application to begin accessing the VPN connection to the remote site.

Figure 4:
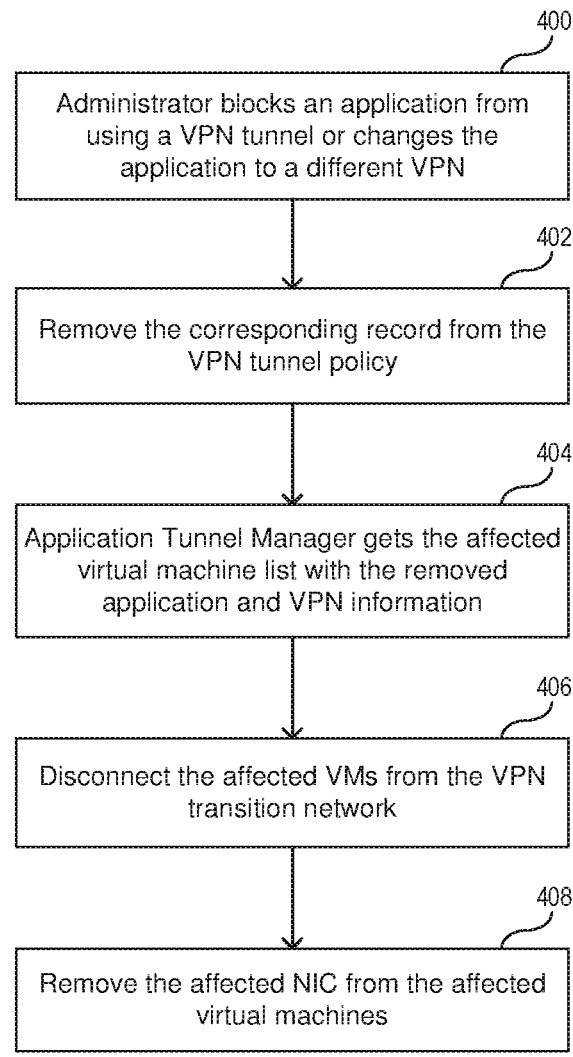
FIG. 4 illustrates an example process for disabling VPN access on a per-application basis in a virtualized computing environment, in accordance with various embodiments.

FIG. 4 illustrates an example process for disabling VPN access on a per-application basis in a virtualized computing environment, in accordance with various embodiments. In operation 400, the administrator blocks an application from using a VPN tunnel previously permitted to the application. Alternatively, the administrator may change the application to use a different VPN tunnel. The administrator can do this by first removing the VPN tunnel record corresponding to the application, as shown in operation 402. In operation 404, the application tunnel manager gets the list of all VMs that are affected by this change in VPN policy. The application tunnel manager also reads the VPN information.

In operation 406, the application tunnel manager invokes the network virtualization software APIs to disconnect each affected VM from the VPN transition network. In operation 408, the application tunnel manager also invokes the hypervisor APIs to remove the affected virtual NIC from each affected VM. At this point, the application will no longer be access the VPN transition network. If the application has been granted access to any other VPN tunnel, the application tunnel manager may perform the process previously described with reference to FIG. 3 in order to enable the application with access to the new VPN tunnel.

Figure 5:
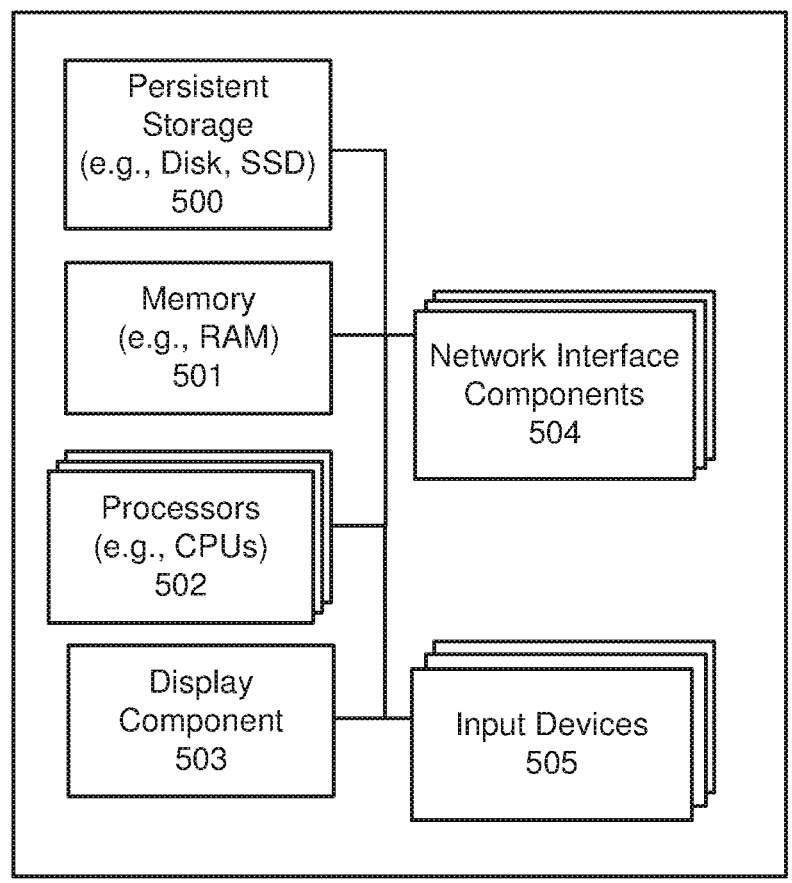
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for enabling per-application virtual private network (VPN) capability during application delivery in a virtualized environment, the method comprising:
   receiving a request to deliver an application to a virtual machine (VM), wherein receiving the request to deliver the application to the VM further comprises:
      detecting a user login to the VM; and
      delivering the application to the virtual machine prior to completing the user login by:
         mounting a virtual disk to the virtual machine, the virtual disk containing one or more files that comprise the application; and
         modifying one or more registry entries on an operating system (OS) of the virtual machine to make the application executable from the mounted virtual disk;
   determining, based on a defined per-application VPN tunnel policy, that the application is permitted to access a VPN tunnel;
   generating a virtual network interface controller (NIC) on the virtual machine; and
   connecting the virtual NIC to a VPN transition network associated with the VPN tunnel, wherein virtual NIC is generated and attached to the VPN transition network at the time of mounting the virtual disk and making the application executable from the mounted virtual disk and prior to completing the user login.

2. The method of claim 1, further comprising:
executing an operating system (OS) script on the VM to configure the application to use the virtual NIC attached to the VPN transition network.

3. The method of claim 1, further comprising:
determining that the per-application VPN tunnel policy has been modified to no longer permit the application to access the VPN tunnel;
disconnecting all virtual machines (VMs) that have been assigned the application from the VPN transition network; and
removing the virtual NIC from the virtual machine.

4. The method of claim 1, wherein the virtual NIC is generated by invoking an application programming interface (API) of a hypervisor executing the VM on a host computing device in a data center.

5. The method of claim 4, wherein the VPN transition network is a subnet of a local network in the data center that is configured to link to a VPN tunnel in a remote location.

6. A computing device, comprising:
at least one processor; and
memory including instructions that, when executed by the at least one processor, cause the computing device to:
receive a request to deliver an application to a virtual machine (VM), wherein receiving the request to deliver the application to the VM further comprises:
detecting a user login to the virtual machine; and
delivering the application to the virtual machine prior to completing the user login by
mounting a virtual disk to the virtual machine, the virtual disk containing one or more files that comprise the application; and
modifying one or more registry entries on an operating system (OS) of the virtual machine to make the application executable from the mounted virtual disk;
determine, based on a defined per-application VPN tunnel policy, that the application is permitted to access a VPN tunnel;
generate a virtual network interface controller (NIC) on the virtual machine; and
connect the virtual NIC to a VPN transition network associated with the VPN tunnel, wherein virtual NIC is generated and attached to the VPN transition network at the time of mounting the virtual disk and making the application executable from the mounted virtual disk and prior to completing the user login.

7. The computing device of claim 6, wherein the memory further comprises instructions executed by the at least one processor to cause the computing device to:
execute an operating system (OS) script on the VM to configure the application to use the virtual NIC attached to the VPN transition network.

8. The computing device of claim 6, wherein receiving the request to deliver the application to the VM further comprises:
determining that the per-application VPN tunnel policy has been modified to no longer permit the application to access the VPN tunnel;
disconnecting all virtual machines (VMs) that have been assigned the application from the VPN transition network; and
removing the virtual NIC from the virtual machine.

9. The computing device of claim 6, wherein the virtual NIC is generated by invoking an application programming interface (API) of a hypervisor executing the VM on a host computing device in a data center.

10. The computing device of claim 9, wherein the VPN transition network is a subnet of a local network in the data center that is configured to link to a VPN tunnel in a remote location.

11. A non-transitory computer readable storage medium comprising one or more sequences of instructions, the instructions when executed by one or more processors causing the one or more processors to execute the operations of:
receiving a request to deliver an application to a virtual machine (VM), wherein receiving the request to deliver the application to the VM further comprises:
detecting a user login to the virtual machine; and
delivering the application to the virtual machine prior to completing the user login by:
mounting a virtual disk to the virtual machine, the virtual disk containing one or more files that comprise the application; and
modifying one or more registry entries on an operating system (OS) of the virtual machine to make the application executable from the mounted virtual disk;
determining, based on a defined per-application VPN tunnel policy, that the application is permitted to access a VPN tunnel;
generating a virtual network interface controller (NIC) on the virtual machine; and
connecting the virtual NIC to a VPN transition network associated with the VPN tunnel, wherein the virtual NIC is generated and attached to the VPN transition network at the time of mounting the virtual disk and making the application executable from the mounted virtual disk and prior to completing the user login.

12. The non-transitory computer readable storage medium of claim 11, further comprising instructions for:
executing an operating system (OS) script on the VM to configure the application to use the virtual NIC attached to the VPN transition network.

13. The non-transitory computer readable storage medium of claim 11, further comprising instructions for:
determining that the per-application VPN tunnel policy has been modified to no longer permit the application to access the VPN tunnel;
disconnecting all virtual machines (VMs) that have been assigned the application from the VPN transition network; and
removing the virtual NIC from the virtual machine.

14. The non-transitory computer readable storage medium of claim 11, wherein the virtual NIC is generated by invoking an application programming interface (API) of a hypervisor executing the VM on a host computing device in a data center.

* * * * *